METHODS OF PRODUCING FILMS COMPRISING SILICEOUS MATERIAL AND THE ARTICLE FORMED THEREBY
Filed March 13, 1972

United States Patent Office 3,825,466

Patented July 23, 1974

3,825,466

METHODS OF PRODUCING FILMS COMPRISING SILICEOUS MATERIAL AND THE ARTICLE FORMED THEREBY

Barry Forester Martin and Edward David Roberts, Salfords, near Redhill, England, assignors to U.S. Philips Coporation Filed Mar. 13, 1972, Ser. No. 234,193
Claims priority, application Great Britain, Mar. 15, 1971, 6,884/71
Int. Cl. C03c *15/00*
U.S. Cl. 161—113 15 Claims

ABSTRACT OF THE DISCLOSURE

Method of producing an apertured siliceous film on a substrate comprising applying a layer of a polysiloxane mixture to the substrate, irradiating the layer with an electron beam in accordance with a desired pattern, etching to the layer to remove the irradiated portions and heating the etched layer to decompose the organic material and leave an apertured siliceous film on the substrate.

This invention relates to a method of producing an apertured siliceous film on a substrate. When the substrate is a semiconductor material, such an apertured siliceous film may be used as a diffusion mask during the manufacture of a semiconductor device, or as a passivating layer on a semiconductor device.

A process has been described by T. P. Woodman in the British Journal of Applied Physics 16, (1965), pages 359 to 364, for producing thin films of silica by the electron bombardment of evaporated thin layers of triphenylsilanol on germanium substrates. After irradiation with an electron beam, the substrates were heated in air at 200° C. so as to remove material unaffected by the electron beam. The substrates were subsequently heated in dry air at a higher temperature, for example, 500° C., to oxidise the polymer to silica. The charge density used for polymerisation was of the order of 10 millicoulombs per square cm.

The investigations which led to the present invention were directed to devising a method of making apertured siliceous films by a positive working process.

Figure 1:
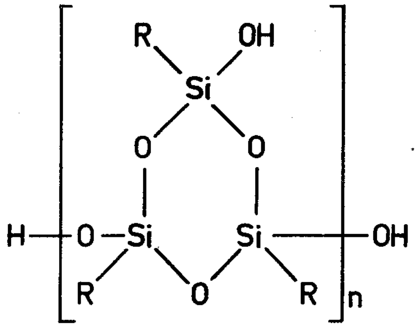
Figure 2:
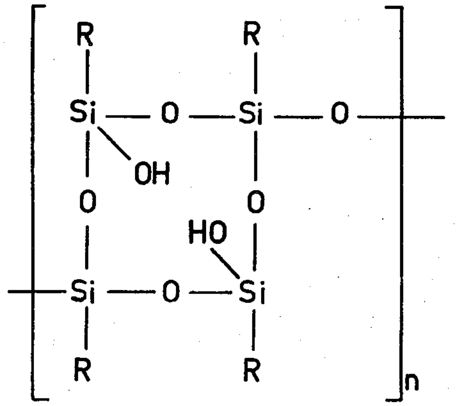
Figure 3:
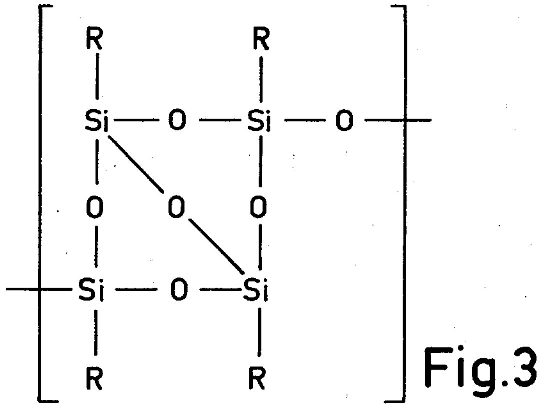

The present invention provides a method of producing an apertured siliceous film on a substate, the method comprising the steps of applying a layer comprising a polysiloxane mixture as hereinafter defined to the substrate, irradiating the layer with an electron beam which penetrates through the layer in accordance with a predetermined pattern, subsequently etching the layer until apertures in accordance with the pattern have been made in the layer and then heating the etched layer so as to decompose the organic material and leave the apertured siliceous film on the substrate. Throughout this specification, the term "polysiloxane mixture" means a mixture of poly-oxy(2,4,6-trialkyl-2-hydroxy - cyclotrisiloxan-4,6-ylenes) and poly-oxy-(2,4,6,8-tetraalkyl-2,6-dihydroxy-cyclotetrasiloxan-4,8-ylenes) in which some of the units have the oxy-(2,4,6,8-tetraalkyl - 2,6-epoxy-cyclotetrasiloxan-4,8-ylene) form. The general structure of these rings and of this unit are shown respectively in FIGS. 1, 2 and 3 of the accompanying diagrammatic drawings, $n$ having values from 1 to 6 and R representing an alkyl group. R is preferably a methyl group.

Before irradiation, the layer may be coated with a coating of a polymer, for example, polymethyl methacrylate or polysobutylene, which is degraded when subjected to electron irradiation. The purpose of this coating is to protect the unirradiated layer of polysiloxane mixture during etching. After irradiation but before etching, the coating is developed with a suitable solvent. The layer comprising the polysiloxane mixture may be hardened by heating or by exposure to ammonia before the coating is applied. Irradiation with the electron beam may be carried out in the presence of from 0 to 5 millitorrs of oxygen. The charge density used for irradiation may be from 50 to 500 microcoulombs per sq. cm. When the substrate is made of a semiconductor material, the apertured siliceous film may serve as a diffusion mask in the course of the manufacture of a semiconductor device. The layer may be etched with a hydrofluoric acid solution, for example, a 2.5 to 20% by weight solution of HF, or with a solution of ammonium fluoride in a hydrofluoric acid solution.

Irradiation of the polysiloxane mixture causes cross-linking of the polysiloxane and the etching step is a preferential etching process, the rate of solution of the irradiated polysiloxane being considerably faster than the rate of solution of the polysiloxane which has not been irradiated.

The polysiloxane mixture may be prepared by hydrolysing an alkyltrichlorosilane. A solution of a polysiloxane mixture which was used in the Examples described below, was prepared as follows:

A mixture of 2½ parts by volume of diethyl ether and 9 parts by volume of ice was prepared, the ice being finely crushed before addition to the ether. The temperature of the ether/ice mixture was between −30° C. and 0° C. The mixture was stirred mechanically, and a solution of 1 part by volume of methyltrichlorosilane in 1 part by volume of diethyl ether was added rapidly. After about five minutes stirring, the mixture was transferred to a separating funnel, and the ethereal layer was separated. The aqueous layer was washed with two portions, each of 1 volume, or diethyl ether, the ethereal layers being added to the original ether extract. The combined ether extracts were washed with portions of 1–1¼ volumes of water until the water washings were neutral to methyl orange.

Further condensation of silonal groups was achieved by treating the ether extract with ammonia solution. (The rate and degree of further condensation achieved depends upon the quantity and concentration of ammonia solution used, the time it is in contact with the ethereal solution of siloxane and the temperature of the system. In these experiments, the quantity of ammonia solution used corresponded to ½–1% $NH_3$ by weight on the expected yield of polymer. Concentrations and times varied between 31% w./v. for 1–2 minutes, and 2.4% w./v. for times up to five hours, for temperatures from 15° to 25° C.) When the desired degree of condensation had been achieved, the ether extract was washed with portions of 1–1¼ volumes of water until ammonia could no longer be detected in the wash water by the following test:

50 mls. wash water in a Nessler cylinder was treated with 1 ml. Nessler's reagent, and the mixture allowed to stand. 50 mls. distilled water was treated similarly. After ten minutes there should be no detectable difference in colour between the sample and the blank solutions.

The ether extract was then dried by distillation under vacuum, the dry product being dissolved in methyl isobutyl ketone as a 25% by weight solution.

The further condensation process may be omitted, in which case the ether extracts which had been washed so that the washings were neutral to methyl orange were dried by distillation under vacuum.

The layer comprising the polysiloxane mixture may be formed using a solution of the mixture in, for example, methyl isobutyl ketone, and applying this solution to the substrate by any coating process such as spreading, dip-coating or spinning so as to prepare a layer of a predetermined thickness, which is then dried.

Organic matter has been removed from the coated substrate by heating in nitrogen, a vacuum, air and pure oxygen.

Figure 4:
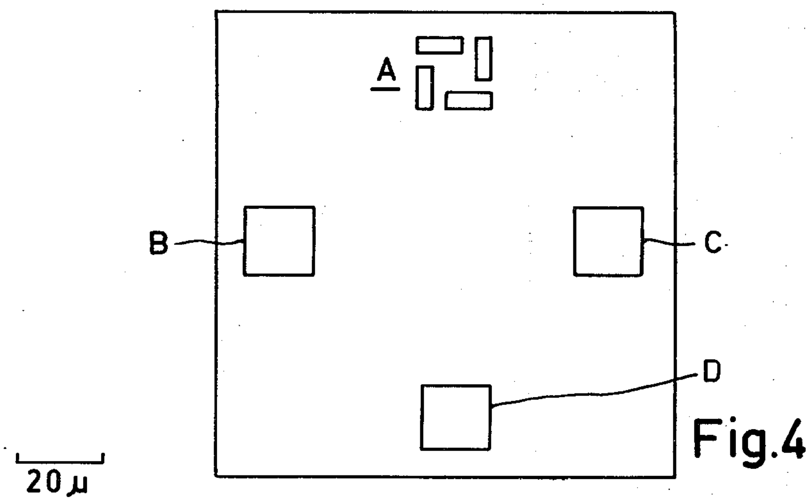

Some embodiments of the present invention will now be described with reference to the following Examples and to FIG. 4 of the accompanying diagrammatic drawing which shows a pattern of apertures made in a siliceous film using the method described in Example 2.

EXAMPLE 1

A 8000 A. thick layer of a polysiloxane mixture as hereinbefore defined was formed on a silicon slice 2.5 cms. in diameter, by applying a 25% by weight solution of the polysiloxane mixture in methyl isobutyl ketone to the slice from a syringe and spinning the slice at 3500 r.p.m. so as to remove the excess material. The slice was then heated in air at 150° C. for 15 minutes so as to make the layer insoluble in organic solvents. The layer was then irradiated in accordance with a predetermined pattern with a 9 kv. electron beam using a charge density of 300 microcoulombs per sq. cm. The slice was then etched in a 5% by weight solution of hydrofluoric acid for 3 minutes at room temperature. This etching process opened windows in accordance with the desired pattern in the layer.The slice was washed and dried before being heated at 600° C. for 20 minutes in a vacuum to remove the organic matter and leave a siliceous film having apertures in accordance with the desired pattern on the silicon slice.

EXAMPLE 2

A silicon slice, 2.5 cms. in diameter, was provided with a layer which consisted of a mixture of the polysiloxane mixture and polymethyl methacrylate, using a solution which consisted of a mixture of 10 parts of a 25% by weight solution of the polysiloxane mixture in methyl isobutyl ketone and 2 parts of a 25% by weight solution of polymethyl methacrylate in methyl isobutyl ketone; before the polymethyl methacrylate solution was prepared, the polymethyl methacrylate was extracted with isopropanol so as to remove the material which was soluble in isopropanol. The silicon slice was then heated in an oven at 150° C. for 15 minutes in air so as to make the layer insoluble in organic solvents. The layer was then coated with a coating of polymethyl methacrylate which was approximately 1200 A. thick, using a 4.5% by weight solution of polymethyl methacrylate (from which the isopropanol-soluble fraction had been removed) in methyl isobutyl ketone. The coating was dried and then the coated slice was irradiated in accordance with a desired pattern shown in FIG. 4, the arrangements of holes at B, C and D being the same as at A, with a 15 kv. electron beam using a charge density of 300 microcoulombs per sq. cm. The coating was then developed by dipping in isopropanol for 10 seconds and the coated slice was then dried. The coated slice was etched in a 5% by weight solution of hydrofluoric acid for 3 minutes at room temperature. The slice was washed and dried before being heated at 600° C. for 20 minutes in a vacuum to remove the organic matter and leave an apertured siliceous film.

EXAMPLE 3

A silicon slice was treated as described in Example 2, except that the coated slice was irradiated in the presence of 3 millitorrs of oxygen. It was found that the slice treated by the method described in Example 2 had a cleaner exposed silicon surface, while the slice treated by this method had better definition of the boundaries of the apertures.

EXAMPLE 4

A silicon slice, 2.5 cms. in diameter, was provided with a layer of the polysiloxane mixture as described in Example 1. The dried layer was exposed for 15 minutes to ammonia vapour emanating from a dish of concentrated (sp. gr. 0.880) ammonium hydroxide, so as to make the layer insoluble in organic solvents. The layer was then coated with a coating of polymethyl methacrylate which was approximately 1200 A. thick, using a 4.5% by weight solution of polymethyl methacrylate (from which the isopropanol-soluble fraction had been removed) in methyl isobutyl ketone. The coating was dried and then the coated slice was irradiated in accordance with a desired pattern with a 9 kv. electron beam using a charge density of 300 microcoulombs per sq. cm. The coating was then developed by dipping in isopropanol for 10 seconds and the coated slice was dried before it was etched at room temperature in a 10% by weight solution of hydrofluoric acid for 1 minute. The slice was washed, dried and then the organic material was burned off by heating the slice gently in the oxidising part of the flame of a bunsen burner.

EXAMPLE 5

A silicon slice, 2.5 cms. in diameter, was provided with a layer of the polysiloxane mixture by the method described in Example 1. A 10,000 A. thick coating of polyisobutylene was then applied over the layer using a 5% by weight solution of Vistanex (Trade Mark) MM–L80 (marketed by Esso Chemicals Ltd.) in ligroin. The coating was dried and then the coated slice was irradiated with a 15 kv. electron beam in accordance with a desired pattern using a charge density of 60 microcoulombs per sq. cm. The coating was developed by coating the slice with silicone fluid MS 200 having a viscosity of 0.65 cs. (supplied by Midland Silicones Ltd.) and spinning the slice; this coating and spinning process was repeated twice. The coated slice was etched at room temperature in a 20% by weight solution of hydrofluoric acid for 1 minute. The slice was washed and dried, and then the polyisobutylene coating was removed by washing in ligroin. The organic component of the remaining polysiloxane was removed by gently heating the slice in the oxidising portion of a bunsen flame.

EXAMPLE 6

The process described in Example 5 was repeated with the additional step of exposing the silicon slice provided with the layer of polysiloxane mixture to ammonia vapour for 15 minutes, so as to make the layer insoluble in organic solvents. There was slightly more residual material left on the irradiated and etched area in this Example than was the case in Example 5, but the edge definition was slightly better than in Example 5.

In each of Examples 1, 2, 4, 5 and 6, the pressure of the atmosphere in which the silicon slices were situated during irradiation was approximately $3\times10^{-6}$ Torrs. Positive images with dimensions down to 5 microns have made using the described methods, and it has been shown that the diffusion of boron is prevented by the resulting silicon films.

The isopropanol-soluble fraction of the polymethyl methacrylate was removed so as to reduce the incidence in pin-holes in the layers and coatings which included or consisted of polymethyl methacrylate.

It was found that the electron beam irradiation caused a shrinkage of about 10% in the thickness of the irradiated areas of the layer. The thickness of the siliceous film is about 80% of the thickness of the layer from which it is formed.

What we claim is:

1. A method of producing an apertured siliceous film on a substrate said method comprising the steps of applying a layer comprising a polysiloxane mixture consisting essentially of a mixture of polyoxy - (2,4,6 - trialkyl - 2 hydroxy-cyclotrisiloxan - 4,6 - ylenes) and polyoxy (2,4, 6,8 - tetraalkyl - 2,6 - dihydroxycyclotetrasiloxan - 4,8-ylenes) in which some of the units have the oxy-(2,4,6,8-tetraalkyl - 2,6 - epoxy-cyclotetrasiloxan - 4,8 - ylene) form to a substrate, irradiating the layer with an electron beam which penetrates through the layer in accordance with a predetermined pattern, subsequently etching the layer until apertures in accordance with the pattern have been made in the layer and then heating the etched layer so as to decompose the organic material and leave the apertured siliceous film on the substrate.

2. A method of claim 1, wherein the alkyl groups in the polysiloxane mixture are methyl groups.

3. A method of claim 2 wherein the layer applied to the substrate consists of a mixture of polymethyl methacrylate and the polysiloxane mixture.

4. A method of claim 2 wherein the etched layer is heated in an oxidizing atmosphere.

5. A method of claim 2, wherein before irradiation the layer is coated with a coating of a polymer which is degraded when subjected to electron irradiation and wherein after irradiation and before etching, the coating is developed.

6. A method as claimed in claim 5 wherein the polymer is polymethyl methacrylate.

7. A method of claim 5 wherein the polymer is polyisobutylene.

8. A method of claim 5, wherein the layer is hardened by exposure to ammonia before the coating is applied.

9. A method of claim 5, wherein the layer is hardened by heating before the coating is applied.

10. A method of claim 2, wherein irradiation with the electron beam is carried out in the presence of from 0 to 5 millitorrs of oxygen.

11. A method of claim 2, wherein the charge density used for irradiation is from 50 to 500 microcoulombs per sq. cm.

12. A method of claim 2, wherein the layer is etched with a hydrofluoric acid solution.

13. A method of claim 12, wherein the hydrofluoric acid solution contains from 2.5 to 20% by weight of HF.

14. A method of claim 2, wherein the substrate consists of a semiconductor material.

15. A substrate bearing an apertured siliceous film produced by a method as claimed in claim 1.

References Cited

UNITED STATES PATENTS

| | | | |
|---|---|---|---|
| 3,243,323 | 3/1966 | Corrigan et al. | 156—17 X |
| 3,536,547 | 10/1970 | Schmidt | 156—17 |
| 3,701,659 | 10/1972 | Doo et al. | 156—17 X |

WILLIAM A. POWELL, Primary Examiner

U.S. Cl. X.R.

156—13, 15, 17; 161—412; 252—79.3